United States Patent [19]

Urakami

[11] Patent Number: 5,588,900
[45] Date of Patent: Dec. 31, 1996

[54] SURFACE TREATING DEVICE

[75] Inventor: Fukashi Urakami, Yokohama, Japan

[73] Assignees: Urakami Research & Development, Kanagawa; Honda Giken Kogyo Kabushiki Kaisha, Tokyo, both of Japan

[21] Appl. No.: 373,246

[22] PCT Filed: May 18, 1994

[86] PCT No.: PCT/JP94/00797

§ 371 Date: Jan. 18, 1995

§ 102(e) Date: Jan. 18, 1995

[87] PCT Pub. No.: WO94/27784

PCT Pub. Date: Dec. 8, 1994

[30] Foreign Application Priority Data

May 23, 1993 [JP] Japan .................................. 5-156025

[51] Int. Cl.[6] ................................................... B24C 3/06
[52] U.S. Cl. ............................. 451/92; 451/87; 180/164
[58] Field of Search ............................. 451/92, 102, 87, 451/99; 180/164

[56] References Cited

U.S. PATENT DOCUMENTS

| 3,916,568 | 11/1975 | Rose et al. | 451/92 |
| 4,045,915 | 9/1977 | Gilbert et al. | 451/102 |
| 4,934,475 | 6/1990 | Urakami | 180/164 |
| 5,191,740 | 3/1993 | Rose | 451/92 |

FOREIGN PATENT DOCUMENTS 4-68118  10/1992  Japan .

0314063  7/1956  Switzerland .............................. 451/92

*Primary Examiner*—Robert A. Rose
*Attorney, Agent, or Firm*—Beveridge, Degrandi, Weilacher & Young, L.L.P.

[57] ABSTRACT

A surface treating device comprising a swivel bearing mechanism, an oscillating tube connected to the swivel bearing mechanism so as to be free to pivot about the axis center of the swivel bearing mechanism and such that with respect to the axis center, an end portion thereof is positioned on the side facing the object surface and the other end portion thereof is positioned on the side opposite to the object surface, a nozzle connected to the one end portion side of the oscillating tube, and a self-revolving/else-revolving mechanism connected to the other end portion side of the oscillating tube and making the nozzle self-revolve and else-revolve about the axis center of the swivel bearing mechanism. The self-revolving/else-revolving mechanism has a main crank rotatably positioned on an axis passing through the axis center of the swivel bearing mechanism, a subordinate crank having a rotating shaft mounted at a site eccentric from the axis of the main crank and having an axis obliquely intersecting the axis of the main crank, and a universal joint means connecting that site in the subordinate crank which is eccentric from the axis, to the other end portion side of the oscillating tube. A main bevel gear is disposed on an axis common to the main crank, and in the subordinate crank there is provided a subordinate bevel gear rotating integrally therewith and engaged with the main bevel gear.

6 Claims, 9 Drawing Sheets

SURFACE TREATING DEVICE

TECHNICAL FIELD

This invention relates to a surface treating device capable of removing foreign matter, such as an old coating or rust, stuck onto the surface of an object, or of roughening the surface of an object, by ejecting a high pressure fluid such as water, or a high pressure fluid mixed with abrasive grains, toward the surface of the object.

The present invention also relates to a surface treating device capable of removing foreign matter, such as an old coating or rust, stuck onto the surface of an object, or of roughening the surface of an object, by ejecting a high pressure fluid such as water, or a high pressure fluid mixed with abrasive grains, toward the surface of the object, while suction-adhering to the surface of the object by the pressure of an ambient fluid such as air or water and moving along the surface.

BACKGROUND ART

So far, ultrahigh pressure water jet equipment and sand blasting equipment have been put to practical use as surface treating devices which eject a high pressure fluid such as water, or a high pressure fluid mixed with abrasive grains, toward the surface of an object, such as an oil reservoir tank or a ship hull, thereby removing foreign matter, such as an old coating or rust, stuck onto the surface of the object; or roughening the surface of the object with the abrasive grains ejected, to make the surface prepared for coating; or cleaning the surface of the object to carry out non-destructive testing.

The devices disclosed in the specification and drawings of U.S. Pat. Nos. 4,095,378 and 4,934,475 are typical examples of a surface treating device which ejects a high pressure fluid such as water, or a high pressure fluid mixed with abrasive grains, toward the surface of an object while suction-adhering to the surface of the object by the pressure of an ambient fluid such as air or water and moving along the surface, thereby removing foreign matter, such as an old coating or rust, stuck onto the surface of the object; or roughening the surface of the object with the abrasive grains ejected, to make the surface prepared for coating; or cleaning the surface of the object to carry out non-destructive testing.

Such a device capable of suction-adhering to the surface of an object and moving along it has a case, a surface sealing means mounted on the case and defining a pressure reduction space in cooperation with the case and the surface, and a pressure reducing means for discharging a fluid from the pressure reduction space to decrease the pressure inside the pressure reduction space. The device can be moved by wheels as moving means, other suitable element such as an endless track, or other suitable moving means such as a vibration generating means. Upon actuation of the pressure reducing means, fluid inside the pressure reduction space is discharged to the outside. Owing to the difference in fluid pressure between the inside and outside of the pressure reduction space, the fluid pressure acts on the case, and is then transmitted to the surface of an object via the wheels or other receiver member. Under this fluid pressure, the device is caused to suction-adhere to the surface of the object. By driving the moving means in this state of suction-adhesion, the device moves along the surface of the object. On this device is mounted working unit such as a surface treating material ejecting means for ejecting a surface treating material, such as high pressure water or abrasive grains, toward the surface of the object. In the present specification, the surface treating material refers to a material, such as a high pressure fluid including high pressure water or compressed air, abrasive grains, or the high pressure fluid mixed with abrasive grains, which can treat the surface of an object when ejected from a nozzle to the surface.

In conventional ultrahigh pressure water jet equipment, about 20 liters/minute of water pressurized to an ultrahigh pressure of about 2,000 to 2,500 kilograms/cm$^2$ is ejected from a nozzle with a diameter of 0.1 to 0.5 mm. Furthermore, this nozzle is revolved at a high speed of about 1,000 rpm with a diameter of gyration of about 400 mm on a plane parallel to the surface of an object 20 to 30 mm apart from the surface. During revolution, the nozzle is gradually moved along the surface of the object at a rate of about 3 meters/minute. Thus, the surface of the object is treated continuously. The reason why the nozzle is revolved at a high speed is that the diameter of the nozzle is so small that its width of treatment is also small. If the nozzle is revolved at a low speed, the problem arises that the surface after treatment has been treated in a linear form resulting only from a trail of the center of the moving nozzle, and not in a surface form. The connection between an ultrahigh pressure hose for supplying the nozzle with ultrahigh pressure water and the nozzle is by a swivel joint. That is, the use of a swivel joint has thus far been absolutely necessary to supply ultrahigh pressure water to the nozzle revolved at a high speed. This type of joint becomes out of order relatively frequently. This use of a swivel joint is likely to make the performance of the ultrahigh pressure water jet equipment unstable.

A possible method of mixing abrasive grains into a stream of ultrahigh pressure water to be ejected from the nozzle is to mix abrasive grains into an ultrahigh pressure water stream on the upstream side of the nozzle. However, the nozzle for feeding the ultrahigh pressure water in the ultrahigh pressure water jet equipment has a small diameter, thus making it difficult to mix abrasive grains, larger in diameter than the nozzle, into an ultrahigh pressure water stream on the upstream side of the nozzle. The mixing of abrasive grains into an ultrahigh pressure water stream therefore requires that a mixing nozzle for mixing ultrahigh pressure water with abrasive grains be provided downstream of the nozzle. Such a method is already in practical use with ultrahigh pressure water jet equipment of a type in which the nozzle is not revolved (e.g. ultrahigh pressure water jet equipment applied to cutting).

In the aforementioned ultrahigh pressure water jet equipment, however, the nozzle is revolved at a high speed, thus requiring that a swivel joint be used for connection between the nozzle and the ultrahigh pressure hose for supplying ultrahigh pressure water to the nozzle. In order to mix abrasive grains into a stream of ultrahigh pressure water, therefore, ultrahigh pressure water and abrasive grains have to be supplied separately to the rotating nozzle through two hoses, i.e., a hose for ultrahigh pressure water and a hose for abrasive grains, and consequently, a swivel joint for a two-phase flow is required. However, such a swivel joint is difficult to produce. Thus, the aforementioned ultrahigh pressure water jet equipment poses difficulty in mixing abrasive grains into an ultrahigh pressure water stream to be ejected from the nozzle revolved at a high speed. Its treating capacity has clear limitations. Specifically, because of the difficulty in mixing abrasive grains into an ultrahigh pressure water stream ejected from the nozzle revolved at a high speed, it is easy to peel off a soft coating, but it is difficult to remove a hard rust. Nor can the ultrahigh pressure water jet equipment form an anchor pattern, i.e. roughness, on the surface of an object, because its formation absolutely requires that abrasive grains be ejected toward the surface of the object and caused to impinge thereon.

In the sand blasting equipment which roughens the surface of an object by directing a jet of abrasive grains at the surface of the object, the use of a swivel joint is absolutely necessary to supply abrasive grains to the nozzle revolved at a high speed. This use of a swivel joint is likely to make the performance of the equipment unstable.

Also in the surface treating device capable of suction-adhering to the surface of an object by the pressure of an ambient fluid such as air or water and moving along the surface, the use of the nozzle revolved at a high speed requires the use of a swivel joint as a means of feeding a high pressure water stream or abrasive grains to the nozzle. Owing to this use of a swivel joint, the performance of the equipment may become unstable. For the same reasons as stated previously, moreover, it is difficult to mix abrasive grains into a high pressure water stream ejected from the nozzle revolving at a high speed. Thus, this device also faces the same problems as does the ultrahigh pressure water jet equipment.

DISCLOSURE OF THE INVENTION

Therefore, a principal object of the present invention is to provide a surface treating device which can feed a surface treating material to a nozzle revolving at a high speed, without using a swivel joint, can thus mix abrasive grains into a high pressure fluid ejected from the nozzle revolving at a high speed, and consequently has a further improved treating capacity.

Another object of the present invention is to provide a surface treating device which can feed a surface treating material to a nozzle revolving at a high speed, without using a swivel joint, thus has fewer troubles, and consequently has stable performance.

Still another object of the present invention is to provide a surface treating device which can revolve the nozzle, or make the nozzle revolve about itself, and can feed a surface treating material to the nozzle revolving at a high speed, without using a swivel joint, thus enabling a more homogeneous surface treatment which gives a treated surface having less uneven quality.

A further object of the present invention is to provide a surface treating device which can feed a surface treating material to a nozzle revolving at a high speed, without using a swivel joint, can thus give an improved treating capacity, and also prevent a substance to be treated—such as an old coating, rust or abrasive grains, which has been peeled off an object during surface treatment—from scattering to the outside of the device to pollute the environment.

A still further object of the present invention is to provide a surface treating device which can feed a surface treating material to a nozzle revolving at a high speed, without using a swivel joint, can thus mix abrasive grains into an ultrahigh pressure fluid ejected from the nozzle revolving at a high speed, and consequently has a further improved treating capacity as well as stable performance, and can also enable efficient and remote-controlled safe surface treatment of the surface of an object having a large surface area, such as an oil reservoir tank or a ship hull.

To attain the above-described principal object, the present invention provides a surface treating device having a nozzle for ejecting a surface treating material toward the surface of an object, which comprises a swivel bearing mechanism, an oscillating tube connected to the swivel bearing mechanism so as to be free to pivot about the axis center of the swivel bearing mechanism and such that with respect to the axis center, an end portion thereof is positioned on the side facing the object surface and the other end portion thereof is positioned on the side opposite to the object surface, the nozzle connected to the one end portion side of the oscillating tube, and a self-revolving/else-revolving mechanism connected to the other end portion side of the oscillating tube and making the nozzle self-revolve and else-revolve about the axis center of the swivel bearing mechanism, the self-revolving/else-revolving mechanism including a main crank which has a driven shaft positioned on an axis passing through the axis center of the swivel bearing mechanism on the other end portion side of the oscillating tube and rotationally driven by a driving means, and which is rotationally driven integrally with the driven shaft; a subordinate crank having a rotating shaft mounted at a site eccentric from the axis of the main crank and having an axis obliquely intersecting the axis of the main crank; a universal joint means connecting that site in the subordinate crank which is eccentric from the axis, to the other end portion side of the oscillating tube; a subordinate bevel gear connected to the rotating shaft of the subordinate crank and rotating integrally with the subordinate crank; a main bevel gear which is provided integrally on a shaft having an axis common to the driven shaft of the main crank and being disposed so as to be free to rotate relative to the driven shaft, and which is engaged with the subordinate bevel gear; and the subordinate bevel gear revolving about the main bevel gear according to the rotation of the main crank while revolving on its own axis.

In the self-revolving/else-revolving mechanism, when the main crank is rotationally driven by the driving means (e.g. a geared motor which is an electric motor), the subordinate bevel gear provided rotatably at a site eccentric from the axis of the main crank revolves about the main bevel gear while revolving on its own axis. The rotating shaft of the subordinate crank is connected integrally to the subordinate bevel gear, and the subordinate crank rotates integrally with the subordinate bevel gear. Thus, the revolution of the subordinate crank on its own axis, and the revolution of the main crank about the other member are transmitted to the other end portion side of the oscillating tube (the end portion on the side opposite to the surface of the object) via the universal joint means provided at a site eccentric from the axis of the subordinate crank. On the other hand, the oscillating tube is free to pivot about the axis center of the swivel bearing mechanism. Thus, the nozzle, which is connected to the one end portion side of the oscillating tube (the end portion on the object surface side) and ejects the surface treating material toward the surface of the object, is caused to self-revolve and else-revolve about the axis center of the swivel bearing mechanism while revolving on its own axis. Such motions of the nozzle result in a marked improvement in the surface treating capacity.

Of particular importance with the above-described actions is that the oscillating tube does not revolve on its own axis when the nozzle is self-revolving and else-revolving about the axis center of the swivel bearing mechanism at the same time, as stated above. As a result, the hose which supplies the surface treating material can be connected to a side surface (circumferential surface) on that other end portion side of the oscillating tube which is the end portion on the side opposite to the surface of the object. Therefore, when the present invention is to be applied to the surface treating device for ejecting only ultrahigh pressure water from the nozzle, one hose for ultrahigh pressure water is connected to the side surface on the other end portion side of the oscillating tube, and one flow path is provided within the oscillating tube. One end of this flow path is connected to the ultrahigh pressure water hose, and the other end thereof is connected to the nozzle, whereby the hose for ultrahigh pressure water and the nozzle can be connected together via the oscillating tube as a joint. Since the hose for ultrahigh pressure water and the nozzle are thus connected together via the oscillating tube as a coupling, no swivel joint is required. Consequently, there is obtained a surface treating device further improved in treating capacity, relatively minimal in trouble, and thus stable in performance. Furthermore, the nozzle is capable of revolving on its own axis as well as about other member, thus enabling an even more rapid surface treatment.

The aforementioned ultrahigh pressure water jet equipment had difficulty in mixing abrasive grains into an ultrahigh pressure water stream ejected from a nozzle revolving at a high speed. Such mixing can be achieved without any problem when the present invention is applied to ultrahigh pressure water jet equipment. That is, the device of the present invention makes it possible to connect a hose for supply of abrasive grains as well as a hose for ultrahigh pressure water to the side surface on the other end portion side of the oscillating tube. Further, by providing two flow paths (a flow path for ultrahigh pressure water and a flow path for supply of abrasive grains) within the oscillating tube, and connecting one end of the flow path for ultrahigh pressure water to the hose for ultrahigh pressure water and the other end of it to the nozzle, the hose for ultrahigh pressure water and the nozzle can be coupled together via the oscillating tube as a joint. Also, by connecting one end of the flow path for supply of abrasive grains to the hose for supply of abrasive grains and the other end of it to a mixing chamber located downstream of the nozzle, the hose for supply of abrasive grains and the mixing chamber located downstream of the nozzle can be coupled together via the oscillating tube as a joint. Namely, the hose for ultrahigh pressure water and the nozzle, and the hose for supply of abrasive grains and the mixing chamber located downstream of the nozzle, respectively, are coupled together via the oscillating tube as a joint, thus requiring no swivel joint. Hence, when the present invention is applied to ultrahigh pressure water jet equipment, not only peeling of a soft coating, but also removal of a hard rust can be performed easily. Formation of an anchor pattern on the surface of an object can also be done readily.

The device of the present invention is also applicable to sand blasting equipment. Since the diameter of a nozzle for sand blasting is 8 to 14 mm, a size much larger than abrasive grains, abrasive grains after being mixed into compressed air can be ejected from the nozzle. Therefore, by connecting one hose for supply of abrasive grains to the side surface on the other end portion side of the oscillating tube, further providing one flow path for supply of abrasive grains within the oscillating tube, and connecting one end of this flow path to the hose for supply of abrasive grains and the other end of it to the nozzle, the hose for supply of abrasive grains and the nozzle can be coupled together via the oscillating tube as a joint. Since the hose for supply of abrasive grains and the nozzle are so coupled together via the oscillating tube as a joint, there is no need for a swivel joint.

In the device of the present invention, the main bevel gear can have its shaft fixed so that this gear will not rotate. Preferably, however, in order for the main bevel gear to rotate, if desired, in a direction opposite to the rotating direction of the main crank, its shaft is adapted to be rotationally driven by a driving means (an example is a geared motor, an electric motor) different from the driving means for the main crank. By rotating the main bevel gear in a direction opposite to the rotating direction of the main crank, the speed of revolution of the subordinate crank, i.e., the subordinate bevel gear, on its own axis can be made even higher. As a result, the speed of revolution of the nozzle on its own axis can be made even higher, thus permitting an even more efficient surface treatment, and enabling a more homogeneous surface treatment which gives a treated surface having less uneven quality.

One preferred embodiment of the swivel bearing mechanism according to the present invention includes an annular main oscillating body having a main oscillating axis on a plane parallel to the surface of an object, and a plate-like subordinate oscillating body connected to the main oscillating body so as to have a subordinate oscillating axis perpendicularly intersecting the main oscillating axis of the main oscillating body, with the oscillating tube being connected to the subordinate oscillating body. This construction gives the function that the respective shafts, on which the oscillating tube oscillates at high speeds, can be maintained for long periods without wear, thus ensuring high durability and reliability. Moreover, the construction is relatively simple, and can be produced at a relatively low cost.

In the device of the present invention, it is preferred that a space, which has as a boundary a plane parallel to the surface of an object and passing the axis center of the swivel bearing mechanism, which is present between the boundary surface and the surface of the object, and which belongs to a zone where the oscillating tube and the nozzle move, is surrounded by a tubular case opening at both end portions, by the surface, by a surface sealing means mounted at that one opening end portion of the case which faces the surface to seal a gap between the case and the surface, and by an oscillating part sealing means for sealing a gap present between the other opening end portion in the case facing the boundary surface and the oscillating tube, whereby a pressure reduction space is defined, the pressure reduction space being connected to a pressure reducing means for discharging a fluid from the pressure reduction space to decrease the pressure inside the pressure reduction space. When the pressure reducing means is actuated, a fluid in the pressure reduction space, such as the air, is expelled to the outside of the case, thereby reducing the pressure of the pressure reduction space. When the pressure reduction space is reduced in pressure, the device is caused to suction-adhere to the surface of the object by the pressure of an ambient fluid, such as the air, that acts due to the difference in fluid pressure between the inside and the outside of the pressure reduction space. The so constructed device makes it possible to feed a surface treating material to the nozzle rotating at a high speed, without using a swivel joint. Consequently, it becomes possible to improve the surface treating capacity and prevent a substance to be treated—such as an old coating, rust or abrasive grains, which has been released from the surface of the object during surface treatment—from being scattered to the outside of the device and polluting the environment. In this construction, the case is a stationary body, while the oscillating tube is a mobile body, so that the a gap (a sealable gap) is provided between the oscillating tube and the other opening end portion in the case facing the boundary surface. Since this gap is sealed by the oscillating part sealing means, the pressure reduction space can be formed easily.

Another preferred embodiment of the swivel bearing mechanism according to the present invention may be a known spherical bearing with a shaft holding hole (not shown). This spherical bearing is mounted on the other opening end portion of the case. In the shaft holding hole is held the oscillating tube as passing through the hole. In the swivel bearing mechanism, a sealable gap is not provided between the oscillating tube and the other opening end portion in the case facing the boundary surface. However, the spherical bearing itself has a sealing function, and so there is no problem with the formation of the pressure reduction space. When the spherical bearing is applied as the swivel bearing mechanism, a relatively highly reliable and relatively inexpensive swivel bearing mechanism is obtained.

The device of the present invention is also preferably constructed such that the case is equipped with a moving means, the device is caused to suction-adhere to the surface by the pressure of an ambient fluid acting on the case owing to the difference in fluid pressure between the inside and the outside of the case upon the actuation of the pressure reducing means, and the device is movable along the surface by the action of the moving means. When the pressure reducing means is actuated, a fluid within the pressure reduction space, such as the air, is expelled to the outside of the case, thereby reducing the pressure in the pressure reduction space. When the pressure reduction space is reduced in pressure, the pressure of an ambient fluid, such as the air, which acts on the case owing to the difference in fluid pressure between the inside and the outside of the pressure reduction space is transmitted to the surface of the object via the moving means, resulting in the suction-adhesion of the device to the surface of the object by the pressure of the ambient fluid. When the moving means is driven in this state of suction-adhesion, the device is moved along the surface of the object as suction-adhered thereto. The so constructed device can feed a surface treating material to a nozzle revolving at a high speed, without using a swivel joint, can thus mix abrasive grains into an ultrahigh pressure fluid ejected from the nozzle revolving at a high speed, and consequently has a further improved treating capacity as well as stable performance, and can also enable efficient and remote-controlled safe surface treatment of the surface of an object having a large surface area, such as an oil reservoir tank or a ship hull.

BEST MODE FOR CARRYING OUT THE INVENTION

Hereinbelow, a surface treating device improved in accordance with the present invention will be described in detail with reference to the appended drawings on the basis of embodiments of the surface treating device capable of suction-adhering to the surface of an object and moving along the surface.

Figure 1:
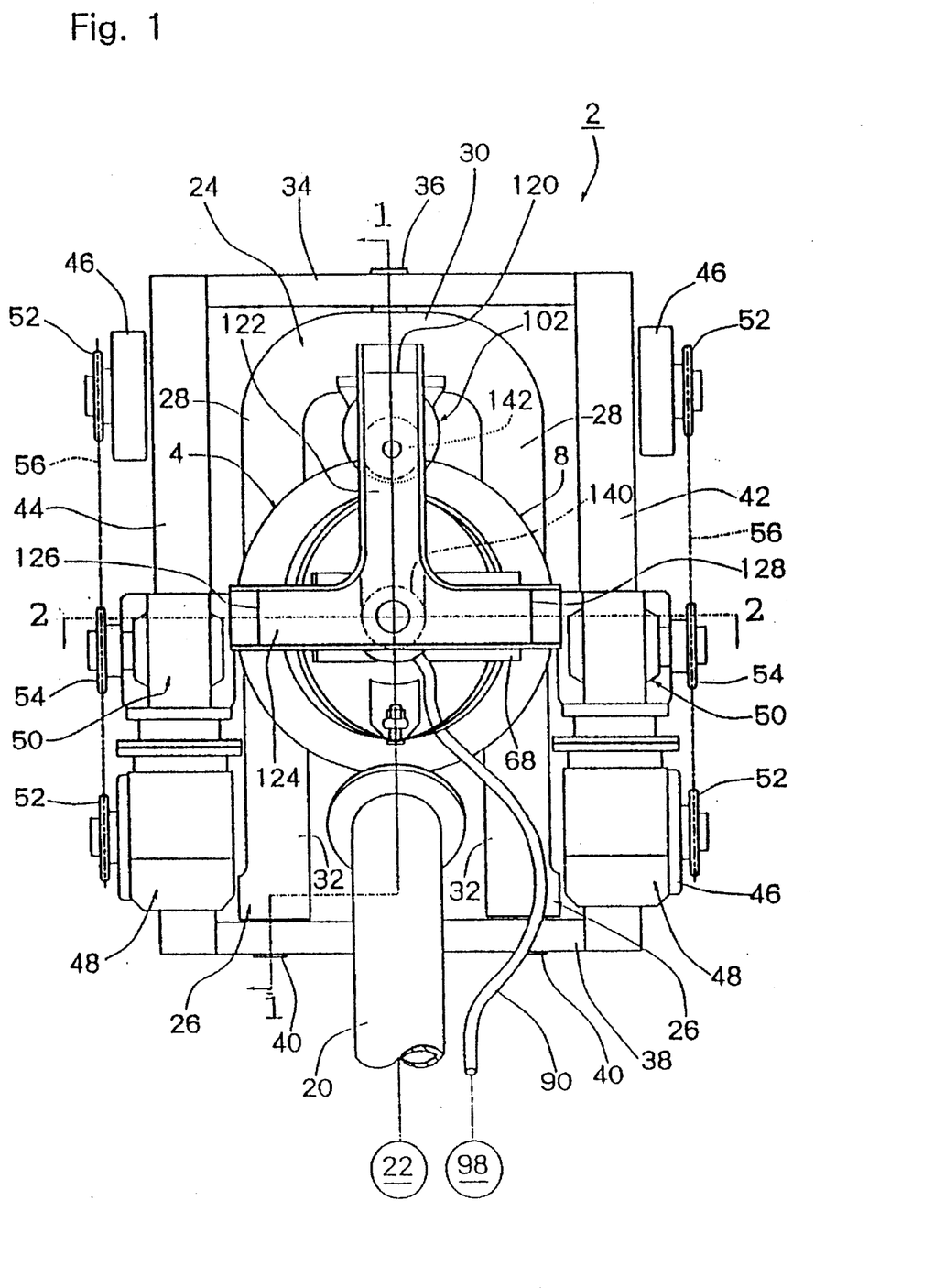
FIG. 1 is a plan view showing an embodiment of a surface treating device constructed in accordance with the present invention.
Figure 2:
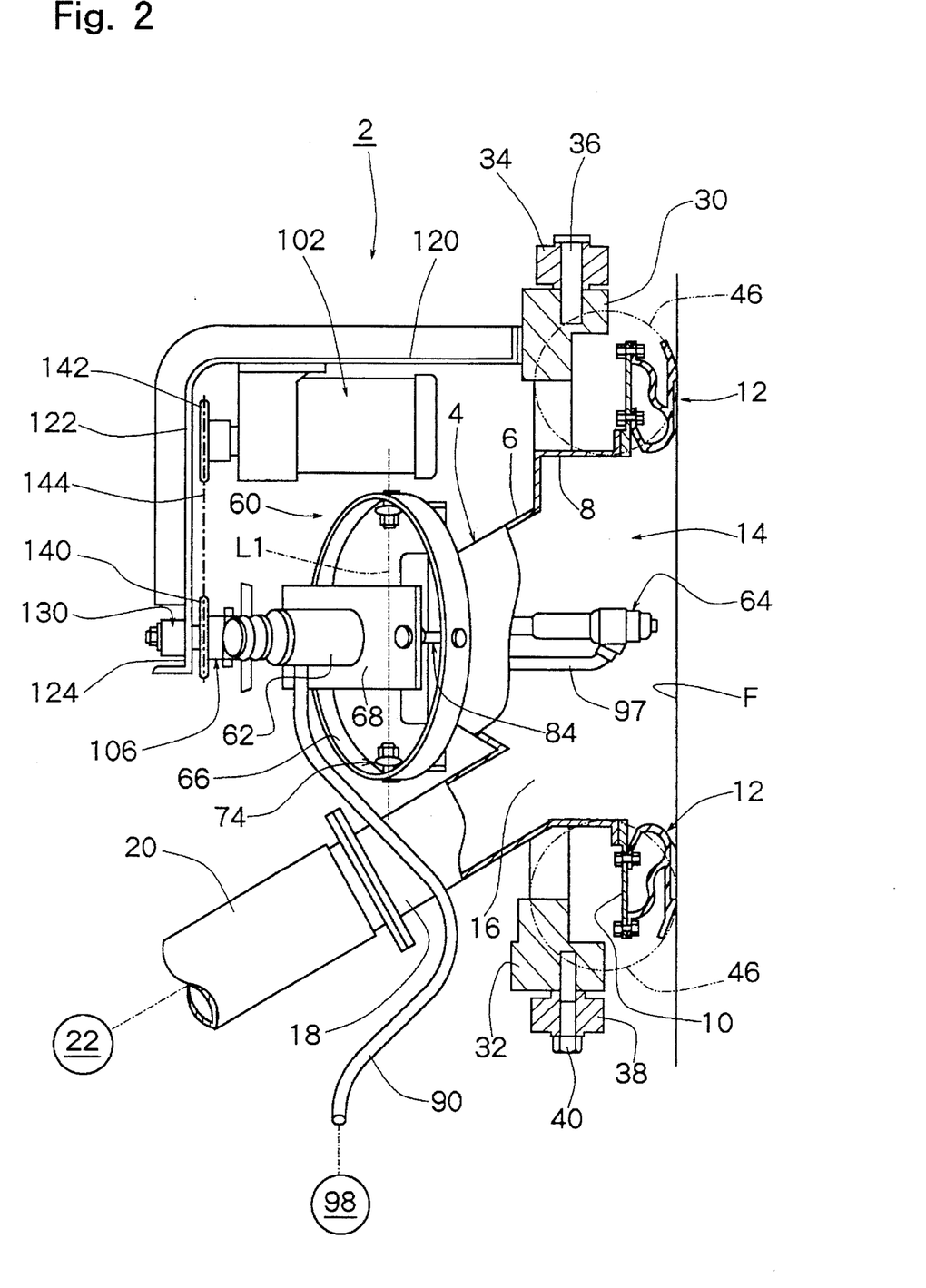
FIG. 2 is a view showing a part of the surface treating device of FIG. 1 as a section taken on line 1—1, and the other part as a right side view.
Figure 3:
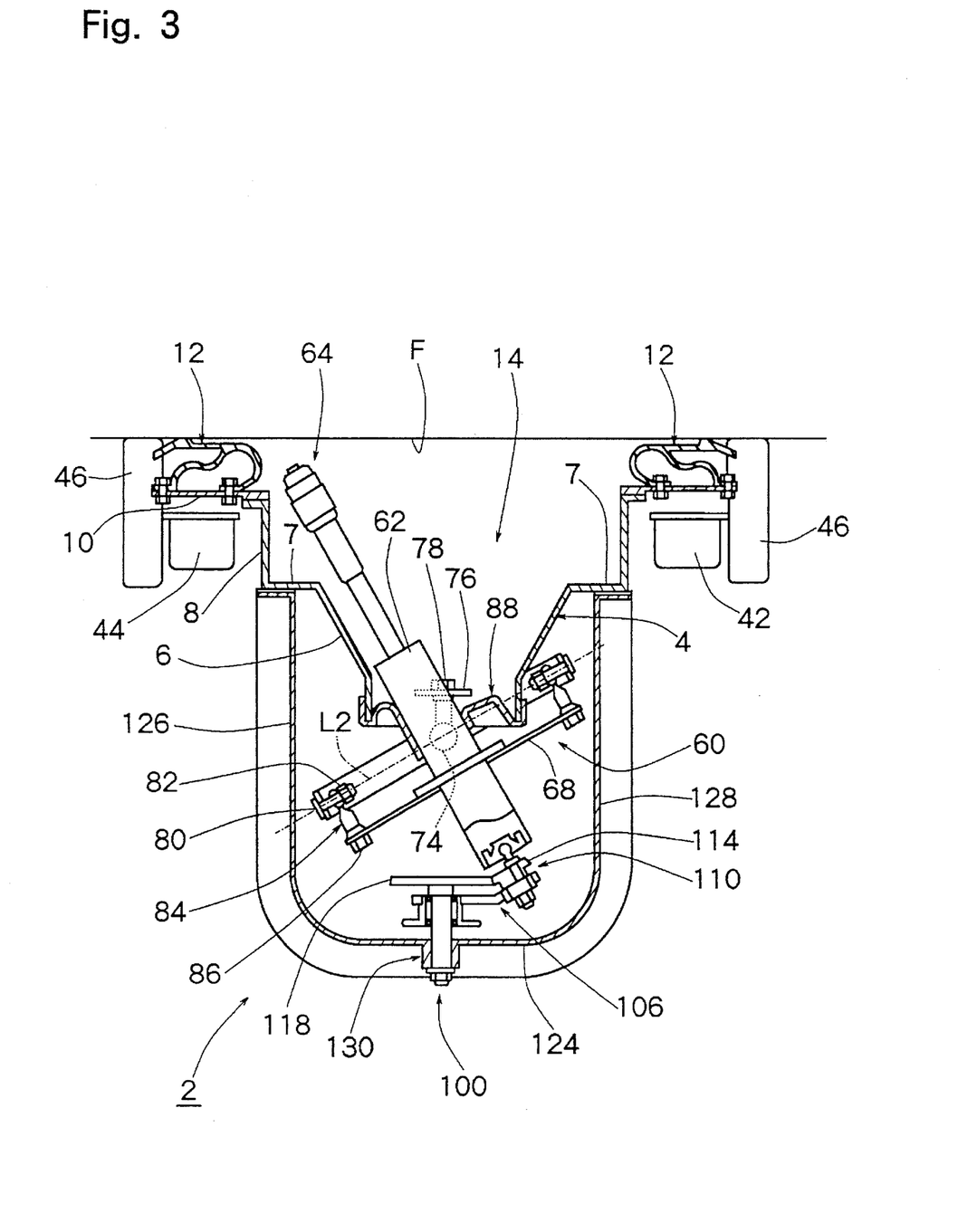
FIG. 3 is a sectional view taken on line 2—2 of the surface treating device illustrated in FIG. 1.

With reference to FIGS. 1 to 3, a surface treating device shown entirely at the numeral 2 has a case 4 which is hollow inside. In this embodiment, the case 4 has a funnel-like portion 6 and a cylindrical portion 8 provided integrally as a continuation of the funnel-like portion 6, and is tubular as a whole. An end portion of the cylindrical portion 8 defines one opening end portion of the case 4 facing the surface, F, of an object, while the end portion of the funnel-like portion 6 defines the other opening end portion of the case 4 facing the opposite side to the surface F. In this embodiment, the surface F consists of a flat surface. At the end portion of the cylindrical portion 8 is provided an annular plate 10 projecting radially outwardly. On the annular plate 10 is mounted a traveling portion seal 12 constituting a surface sealing means which seals a gap between the case 4 and the surface F. The traveling portion seal 12 is formed of a relatively flexible material such as urethane rubber or plastic. As will be understood from FIGS. 2 and 3, the traveling portion seal 12 is nearly a torus in its entire form. The traveling portion seal 12 is in contact with the surface F, and defines a pressure reduction space 14 in cooperation with the case 4, the surface F, and an oscillating part sealing means 88 to be described later. In the funnel-like portion 6 of the case 4 is formed an opening 16, to which a connecting pipe 18 is connected. The connecting pipe 18 is connected to a pressure reducing means 22 via a flexible suction hose 20. The pressure reducing means 22 may be composed of a suitable evacuating means such as a vacuum pump or an ejector. When the device 2 is to be used in a liquid such as water, the evacuating means may be composed of a drainage pump. Therefore, when the pressure reducing means 22 is actuated, a fluid inside the pressure reduction space 14, such as the air, is expelled to the outside via the suction hose 20, whereupon the pressure reduction space 14 is reduced in pressure and the device 2 is caused to suction-adhere to the surface F.

At the outside of the case 4, i.e., the outside of the torus-like portion 8 are fixed two case frames 24 located above the torus-like portion 8 in FIG. 1, and case frames 26 located below the torus-like portion 8 in FIG. 1. The case frame 24 has extensions 28 extending above the torus-like portion 8 parallel to each other at a distance in the right-and-left direction, and a mounting portion 30 extending between these extensions 28, in FIG. 1. The respective case frames 26 comprise extensions 32 extending below the torus-like portion 8 parallel to each other at a distance in the right-and-left direction in FIG. 1. To the upper surface, as viewed in FIG. 1, of the mounting portion 30 of the case frame 24 is connected a transverse frame 34 by a connecting pin 36. To the end portion of each case frame 26 is secured a transverse frame 38 by fastening bolts 40. A traveling frame 42 is fixed between one end of the transverse frame 34 (the right end in FIG. 1) and one end of the transverse frame 38 (the right end in FIG. 1), while a traveling frame 44 is fixed between the other end of the transverse frame 34 (the left end in FIG. 1) and the other end of the transverse frame 38 (the left end in FIG. 1). The traveling frames 34 and 38, and the traveling frames 42 and 44 form a frame body substantially rectangular in the plan view as shown in FIG. 1.

On the traveling frame 42 are mounted two wheels 46 constituting a moving means, a geared motor 48 constituting a rotary drive source, and a reduction gear mechanism 50. The respective wheels 46 are fixed to axles supported rotatably on the traveling frame 42, and a sprocket 52 is further fixed to each axle. The output shaft of the geared motor 48 is connected to the input shaft of the reduction gear mechanism 50, and a sprocket 54 is fixed to the output shaft of the reduction gear mechanism 50. An endless roller chain 56 is wound over the sprockets 52 and 54. When the geared motor 48 is energized (actuated), therefore, each wheel 46 is rotationally driven. Similar traveling equipment is mounted on the traveling frame 44, but its structure and actions are substantially the same as the aforementioned equipment mounted on the traveling frame 42; hence, the same numerals will be assigned to the same parts, and explanations omitted. If desired, instead of the wheels 46, there may be employed another suitable moving element such as an endless track. Furthermore, the device 2 may be moved by other suitable moving means such as a vibration generating means as disclosed in the specification and drawings of U.S. Pat. No. 4,934,475.

With reference to FIGS. 1 to 5, the illustrated surface treating device 2 includes a swivel bearing mechanism 60; an oscillating tube 62 connected to the swivel bearing mechanism 60 so as to be free to pivot about the axis center P1 of the swivel bearing mechanism 60 and such that with respect to the axis center P1, one end portion thereof is positioned on the side facing the object surface F and the other end portion thereof is positioned on the side opposite to the surface F; a nozzle 64 connected to the one end portion side of the oscillating tube 62; and a self-revolving/else-revolving mechanism 100 connected to the other end portion side of the oscillating tube 62 to make the nozzle 64 self-revolve and else-revolve about the axis center P1 of the swivel bearing mechanism 60.

The illustrated swivel bearing mechanism 60 includes an annular main oscillating body 66 having a main oscillating axis L1 on a plane parallel to the surface F, and a plate-like subordinate oscillating body 68 connected to the main oscillating body 66 so as to have a subordinate oscillating axis L2 perpendicularly intersecting the main oscillating axis L1 of the main oscillating body 66. The oscillating tube 62 is connected to the subordinate oscillating body. More specifically, in the main oscillating body 66 comprising a circular ring-like plate member, a rod end 74 is rotatably connected, at each of two sites on the main oscillating axis L1, by a bolt 70, which is mounted so as to protrude radially inwardly of the main oscillating body 66, and a nut 72. Each rod end 74 is fixed by a bolt 78 to a holding plate 76 secured at each of two sites on the outside of the end portion of the funnel-like portion 6 of the case 4. Each holding plate 76 is positioned parallel to the surface F, and each rod end 74 is positioned so as to be erected on that side of each holding plate 76 which does not face the surface F. Also, in the main oscillating body 66, a rod end 84 is rotatably connected, at each of two sites on the subordinate oscillating axis L2, by a bolt 80, which is mounted so as to protrude radially inwardly of the main oscillating body 66, and a nut 82. Each rod end 84 is fixed by a bolt 86 to each of both end portions of the subordinate oscillating body 68 comprising a plate member substantially rectangular in shape. The subordinate oscillating body 68 is positioned parallel to the subordinate oscillating axis L2, and each rod end 84 is positioned so as to be erected on that side of the subordinate oscillating body 68 which faces the surface F. The intersection of the main oscillating axis L1 and the subordinate oscillating axis L2 defines the axis center P1.

Another preferred embodiment of the swivel bearing mechanism 60 may be a known spherical bearing with a shaft holding hole (not shown). This spherical bearing is mounted on the other opening end portion of the case 4. In the shaft holding hole is held the oscillating tube 62 as passing through the hole. In this swivel bearing mechanism, a sealable gap is not provided between the oscillating tube 62 and the other opening end portion in the case 4. However, the spherical bearing itself has a sealing function, and so there is no problem with the formation of the pressure reduction space 14.

At the center of the subordinate oscillating body 68 is fixed the cylindrical oscillating tube 62 as passing through the subordinate oscillating body 68. That is, a through-hole 69 is formed at the center of the subordinate oscillating body 68, and the oscillating tube 62 is inserted in the through-hole 69 as passing therethrough. Nearly at the center in the axial direction of the oscillating tube 62 is fixed a flange 63 protruding radially outwardly. This flange 63 is positioned so as to contact that side of the subordinate oscillating body 68 which faces the surface F. Because the flange 63 is fixed to the subordinate oscillating body 68 by a suitable fixing means such as a bolt and a nut or a weld, the oscillating tube 62 is fixed to the subordinate oscillating body 68. A part of the oscillating tube 62 and the nozzle 64 are positioned so as to protrude into the case 4, i.e., the pressure reduction space 14 through the other opening end portion of the case 4. Between the other opening end portion of the case 4 and the oscillating tube 62 there is a sealable gap which is sealed by an oscillating part sealing means 88 provided between the other opening end portion of the case 4 and the oscillating tube 62. The oscillating part sealing means 88 may be composed of a suitable material, such as synthetic rubber, which has flexibility and has the function to seal a fluid in. Assume that a plane parallel to the object surface F and passing through the axis center P1 of the swivel bearing mechanism 60 is a boundary surface. Then, the space that exists between this boundary surface and the surface F and belongs to the zone where the oscillating tube 62 and the nozzle 64 move is surrounded by the case 4, the surface F, the surface sealing means 12, and the oscillating part sealing means 88, whereby the pressure reduction space 14 is defined.

Figure 10:
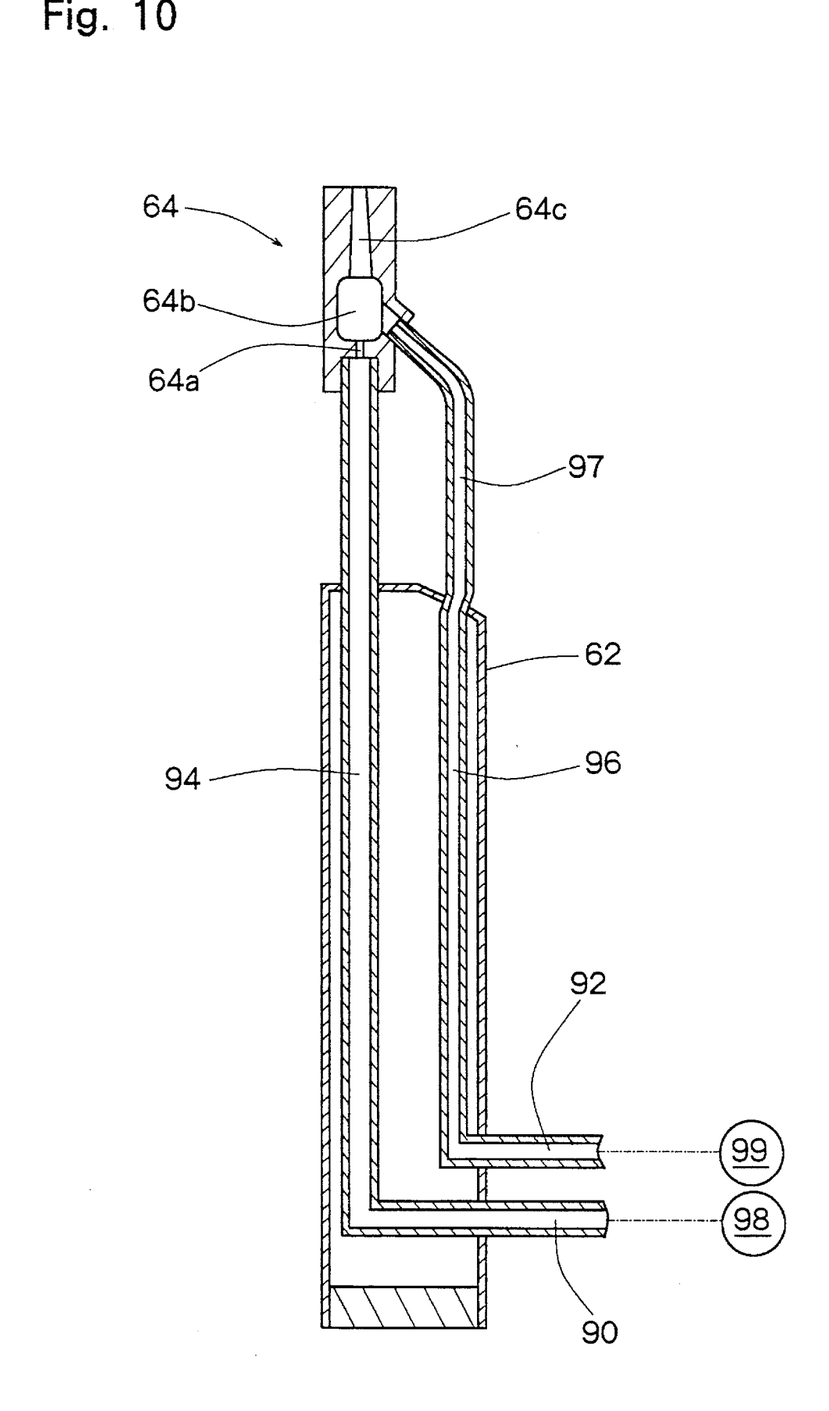
FIG. 10 is a sectional view conceptually showing the flow paths for ultrahigh pressure water and abrasive grains in the oscillating tube and the nozzle.

In Referring to FIGS. 2 and 10, the nozzle 64 has an ultrahigh pressure water nozzle (orifice) 64a, a mixing chamber 64b disposed downstream thereof for mixing ultrahigh pressure water with abrasive grains, and a mixing nozzle 64c disposed downstream of the mixing chamber 64b for ejecting a mixture of ultrahigh pressure water and abrasive grains. To a side surface on the other end portion side of the oscillating tube 62 are connected separately an ultrahigh pressure water hose 90 and a hose 92 for supply of abrasive grains (shown only in FIG. 10). Inside of the oscillating tube 62 are provided two flow paths, an ultrahigh pressure water flow path 94 and a flow path 96 for supply of abrasive grains. One end of the ultrahigh pressure water flow path 94 is connected to the ultrahigh pressure water hose 90, while the other end of it is connected to the upstream side of the ultrahigh pressure water nozzle 64a of the nozzle 64. As a result, the ultrahigh pressure water hose 90 and the nozzle 64 are connected to each other via the oscillating tube 62 as a joint. On the other hand, one end of the flow path 96 for supply of abrasive grains is connected to the hose 92 for supply of abrasive grains, while the other end of it is connected to the mixing chamber 64b of the nozzle 64. As a result, the hose 92 for supply of abrasive grains and the mixing chamber 64b of the nozzle 64 are connected to each other via the oscillating tube 62 as a joint. The other end of the flow path 96 for supply of abrasive grains is connected to the mixing chamber 64b via a connecting hose 97 provided so as to connect one end portion of the oscillating tube 62 to the inlet for abrasive grains of the mixing chamber 64b. The ultrahigh pressure water hose 90 is connected to an ultrahigh pressure water feeding means 98, while the hose 92 for supply of abrasive grains is connected to an abrasive grains feeding means 99. The ultrahigh pressure water feeding means 98 may be composed of, say, an ultrahigh pressure water pump, and the abrasive grains feeding means 99 may be composed of, say, an abrasive grains quantitatively feeding means.

Next, a self-revolving/else-revolving mechanism 100, which makes the oscillating tube 62 and the nozzle 64 self-revolve and else-revolve about the axis center P1 of the swivel bearing mechanism 60, will be described with reference to FIGS. 1 to 5. The self-revolving/else-revolving mechanism 100 has a main crank 106 having a driven shaft 104 which is positioned on an axis L3 passing through the axis center P1 of the swivel bearing mechanism 60 on the other end portion side of the oscillating tube 62 and which is rotationally driven by a geared motor 102 constituting a driving means, the main crank 106 being rotationally driven integrally with the driven shaft 104; a subordinate crank 110 having a rotating shaft 108 mounted at a site eccentric from the axis L3 of the main crank 106 and having an axis L4 obliquely intersecting the axis L3 of the main crank 106; a spherical joint 112 being a universal joint means connecting that site in the subordinate crank 110 which is eccentric from the axis L4, to the other end portion side of the oscillating tube 62; a subordinate bevel gear 114 connected to the rotating shaft 108 of the subordinate crank 110 and rotating integrally with the subordinate crank 110; and a main bevel gear 118 being provided integrally on a shaft 116 which has the axis L3 common to the driven shaft 104 of the main crank 106 and which is disposed rotatably relative to the driven shaft 104, and being engaged with the subordinate bevel gear 114. The relation of the subordinate bevel gear 114 to the main bevel gear 118 is defined such that the subordinate bevel gear 114 revolves about the main bevel gear 118 according to the rotation of the main crank 106 while revolving on its own axis.

The self-revolving/else-revolving mechanism 100 will be described in more detail. At the central part in the right-and-left direction (FIG. 1) of the mounting portion 30 of the case frame 24 is fixed one end of a foot 120 upright in a direction opposite to the surface F. The other end of the foot 120 is coupled integrally to one end portion of a holding portion 122 extending parallel to the surface F. The other end portion of the holding portion 122 is coupled, at a site on the axis L3 of the main crank 106, integrally to a central part of a holding portion 124 extending in the right-and-left direction of FIG. 1 and parallel to the surface F. One end portion of the holding portion 124 (the left end portion in FIGS. 1 and 3) is coupled integrally to the other end of a foot 126 which extends toward the surface F and whose one end is fixed to an annular flat shoulder portion 7 formed between the funnel-like portion 6 and the torus-like portion 8 in the case 4. The other end portion of the holding portion 124 (the right end portion in FIGS. 1 and 3) is coupled integrally to the other end of a foot 128 which extends toward the surface F and whose one end is fixed to the annular flat shoulder portion 7 formed between the funnel-like portion 6 and the torus-like portion 8 in the case 4. The holding portions 122 and 124, and the feet 120, 126 and 128 have a cross section substantially shaped like a channel.

One end portion of the shaft 116 of the main bevel gear 118 is fixed by means of a nut 132 to a shaft holding portion 130 formed on the holding portion 124 so that the shaft 116 is not rotatable. The other end portion of the shaft 116 is positioned so as to protrude from the holding portion 124 toward the surface F. To this other end portion of the shaft 116 is fixed the main bevel gear 118. The driven shaft 104 of the main crank 106 is rotatably supported on the shaft 116 of the main bevel gear 118 via a ball bearing 134. The rotating shaft 108 of the subordinate crank 110 is rotatably supported on the main crank 106 via a ball bearing 136. One end of the spherical joint 112 is fixed to the subordinate crank 110, and a sphere 138 is formed in the other end of it. The sphere 138 is connected relatively rotatably to a suitable sphere receiving means provided at the other end portion side of the oscillating tube 62. To the driven shaft 104 of the main crank 106 is fixed a sprocket 140. On the foot 120 is mounted the geared motor 102. To the output shaft of the geared motor 102 is fixed a sprocket 142. Between the sprocket 140 and the sprocket 142 is mounted a roller chain 144. Therefore, when the geared motor 102 is energized (actuated), the main crank 106 is rotationally driven via the sprocket 142, the roller chain 144, the sprocket 140, and the driven shaft 104. Theoretically, a structure is feasible in which the one end of the spherical joint 112 is fixed to the other end portion side of the oscillating tube 62, and the sphere 138 is connected relatively rotatably to a suitable sphere receiving means provided in the subordinate crank 110.

The surface treating device 2 having the foregoing construction will be described. With reference to FIGS. 1 to 4, when the pressure reducing means 22 is energized (actuated), a fluid within the pressure reduction space 14, such as the air, is discharged to the outside through the suction hose 20, whereupon the pressure reduction space 14 is reduced in pressure. Once the pressure reduction space 14 has been reduced in pressure, the pressure of an ambient fluid, such as the air, acting on the case 4 owing to the difference in fluid pressure between the inside and the outside of the pressure reduction space 14 is transmitted to the surface F via the transverse frames 34 and 38, traveling frames 42 and 44, and each wheel 46. Thus, the device 2 is caused to suction-adhere to the surface F by the pressure of the ambient fluid. In such a state of suction-adhesion, moreover, when each geared motor 48 is energized, the device 2 is moved along the surface F while suction-adhering to the surface F.

Referring to FIGS. 2 to 5, the actions of the swivel bearing mechanism 60 will be described. The main oscillating body 66 is free to pivot about the main oscillating axis L1, while the subordinate oscillating body 68 is free to pivot about the subordinate oscillating axis L2. Thus, the oscillating tube 62 supported on the subordinate oscillating body 68 and the nozzle 64 are free to pivot about the axis center P1 of the swivel bearing mechanism 60. However, the oscillating tube 62 itself does not revolve one axis.

The actions of the self-revolving/else-revolving mechanism 100 will be described with reference to FIGS. 5 to 7. When the geared motor 102 is energized, the main crank 106 is rotationally driven. As a result, the subordinate bevel gear 114 revolves about the main bevel gear 118, but the main bevel gear 118 is fixed so as not to rotate. Hence, in accordance with the rotation of the main crank 106, the subordinate bevel gear 114 and the subordinate crank 110 integral with the subordinate bevel gear 114 revolve on their own axes. The revolution of the subordinate crank 110 on its own axis, and the revolution of the main crank 106 about some member else are transmitted to the other end portion side of the oscillating tube 62 via the spherical joint 112 provided at a portion eccentric from the axis L4 of the subordinate crank 110. As aforementioned, on the other hand, the oscillating tube 62 is free to pivot about the axis center P1 of the swivel bearing mechanism 60; thus, the oscillating tube 62 and the nozzle 64 self-revolve and else-revolve about the axis center P1 of the swivel bearing mechanism 60 as the center of revolution.

Figure 5:
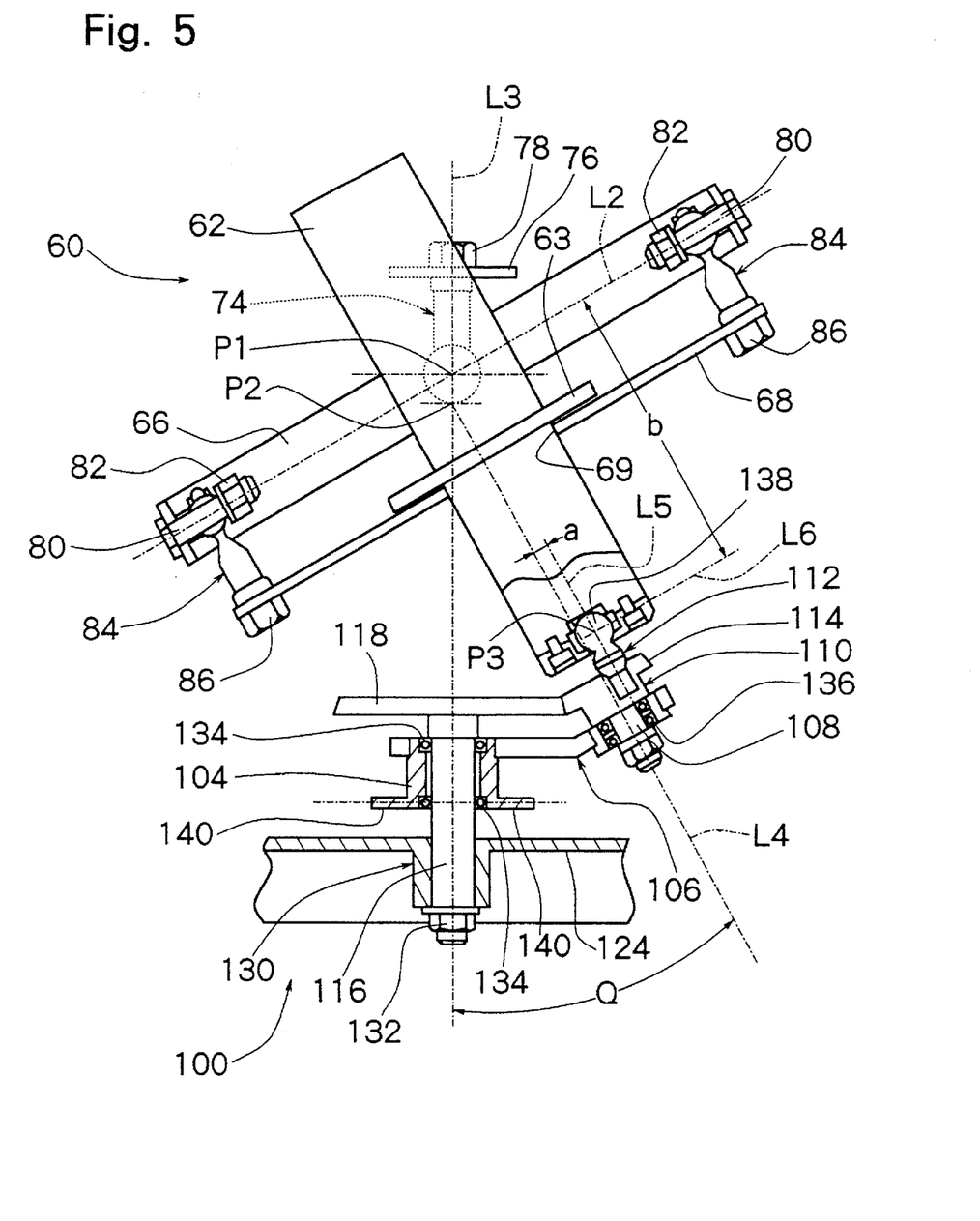
FIG. 5 is a partially enlarged view of the self-revolving/else-revolving mechanism and the swivel bearing mechanism illustrated in FIG. 3.
Figure 6:
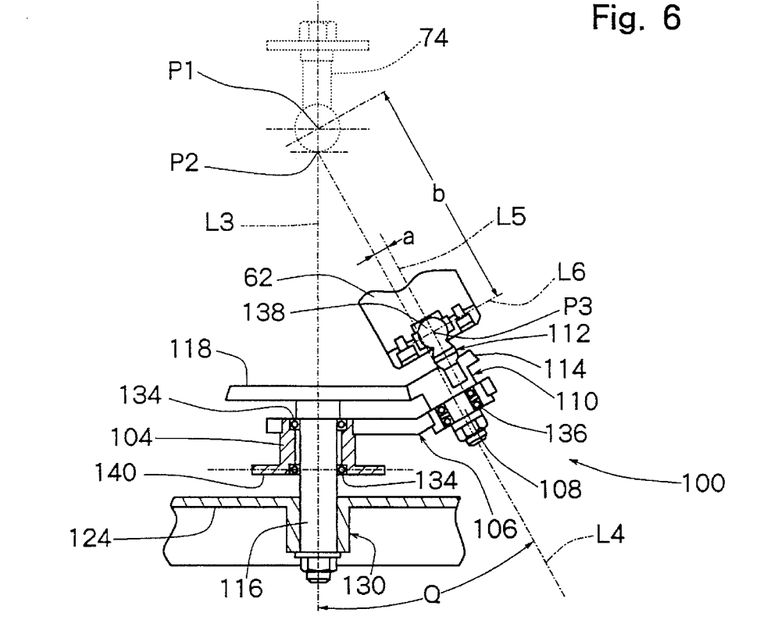
FIG. 6 is a partially enlarged view of the self-revolving/else-revolving mechanism illustrated in FIG. 5.
Figure 7:
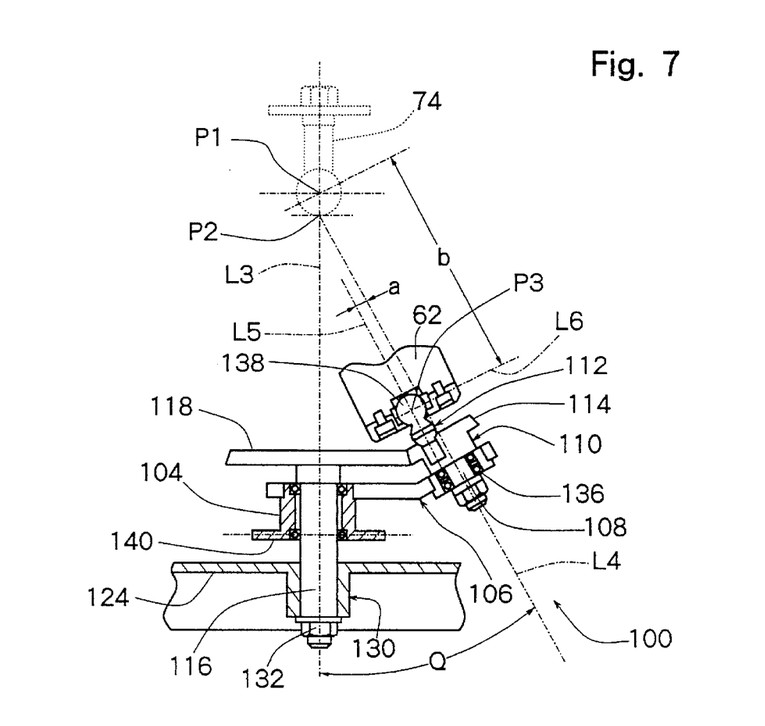
FIG. 7 is a partially enlarged view showing a state in which the subordinate crank and the spherical joint of the self-revolving/else-revolving mechanism illustrated in FIG. 6 are rotationally moved through 180°.

In FIGS. 5 to 7, the angle at which the axis L4 of the subordinate bevel gear 114 obliquely intersects the axis L3 of the main bevel gear 118 is expressed as Q; the point of the oblique intersection, as P2; the distance between the axis L4 of the subordinate crank 110 and the axis L5 of the spherical joint 112, as a; and the distance between the surface of revolution of the center P3 of the sphere 138 of the spherical joint 112 and the axis center P1 of the swivel bearing mechanism 60, as b.

Figure 4:
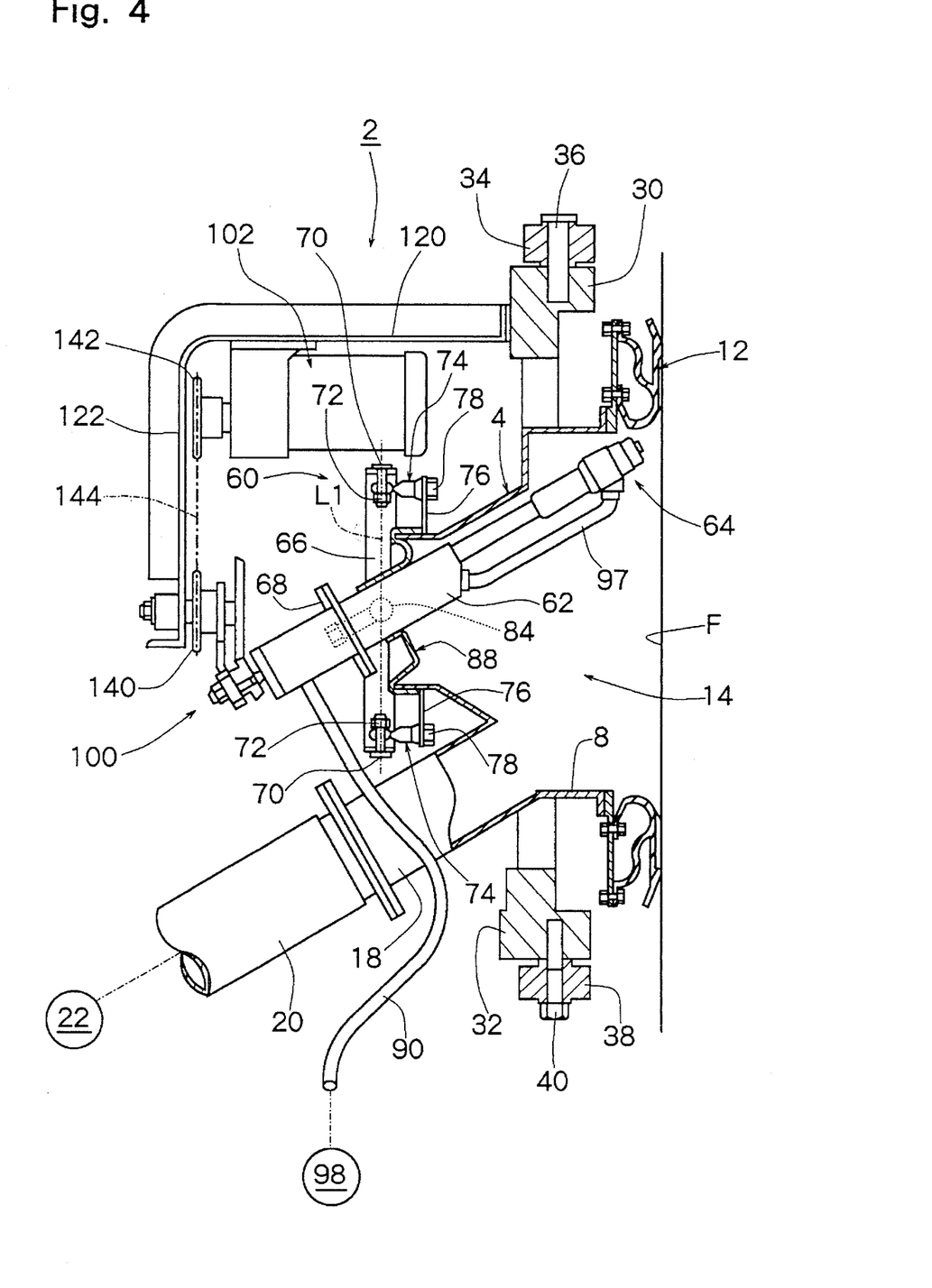
FIG. 4 is a view showing a state in which the nozzle of the surface treating device illustrated in FIG. 2 is rotationally moved through 90° clockwise as viewed from the left end of FIG. 2, with a part of the device being shown as a section taken on line 1—1, and the other part as a right side view.

When referring to FIGS. 4 and 10, by actuating the ultrahigh pressure water feeding means 98 and the abrasive grains feeding means 99, ultrahigh pressure water and abrasive grains are ejected vigorously toward the object surface F from the nozzle 64 revolving on its own axis and about some member else. After the ultrahigh pressure water and abrasive grains collided with the surface F, they are sucked and recovered by the pressure reducing means 22 through the suction hose 20 together with foreign matter peeled off the surface F.

Figure 8:
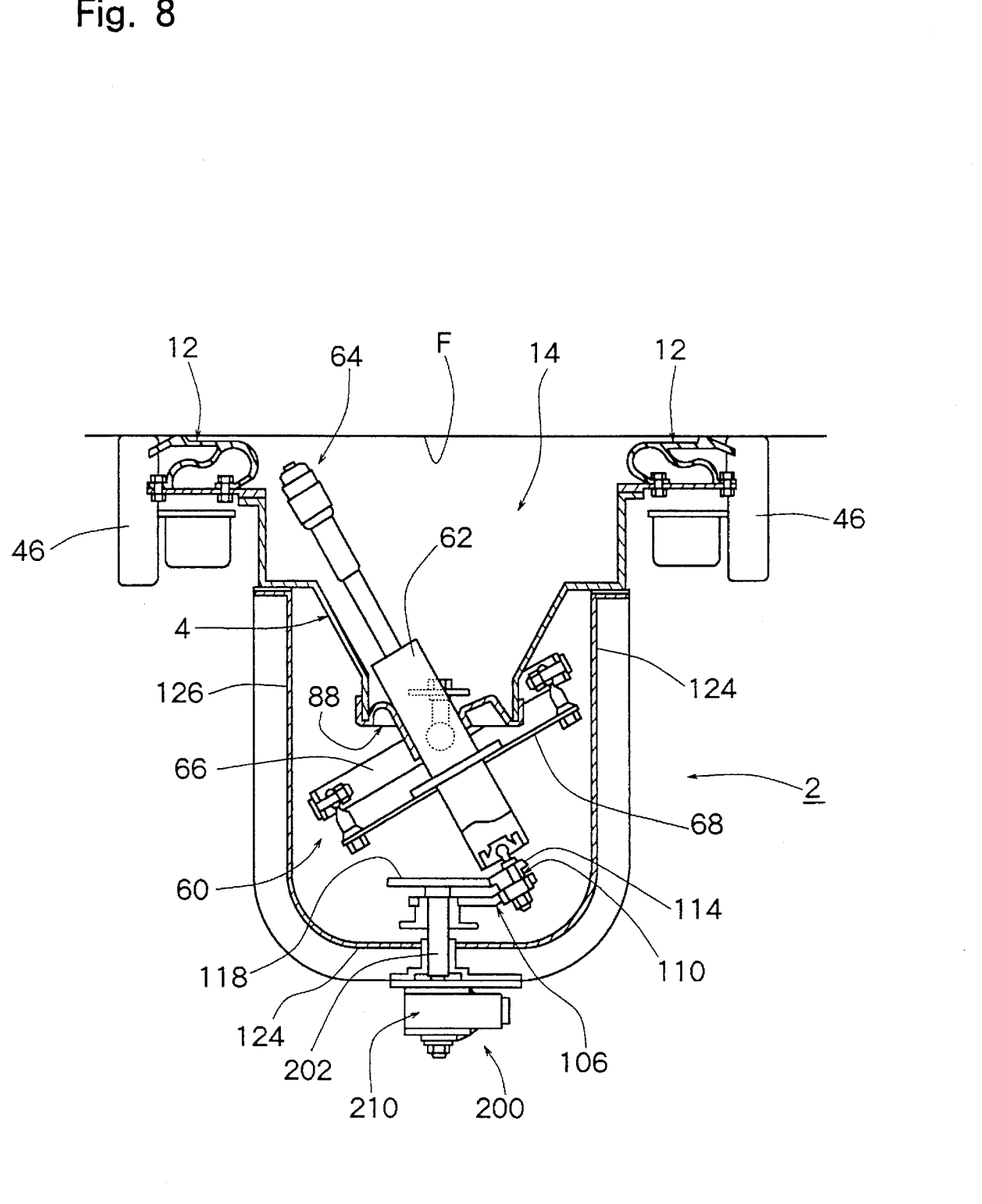
FIG. 8 is a view of the surface treating device illustrated in FIG. 3, in which a part of the self-revolving/else-revolving mechanism is provided with other embodiment.
Figure 9:
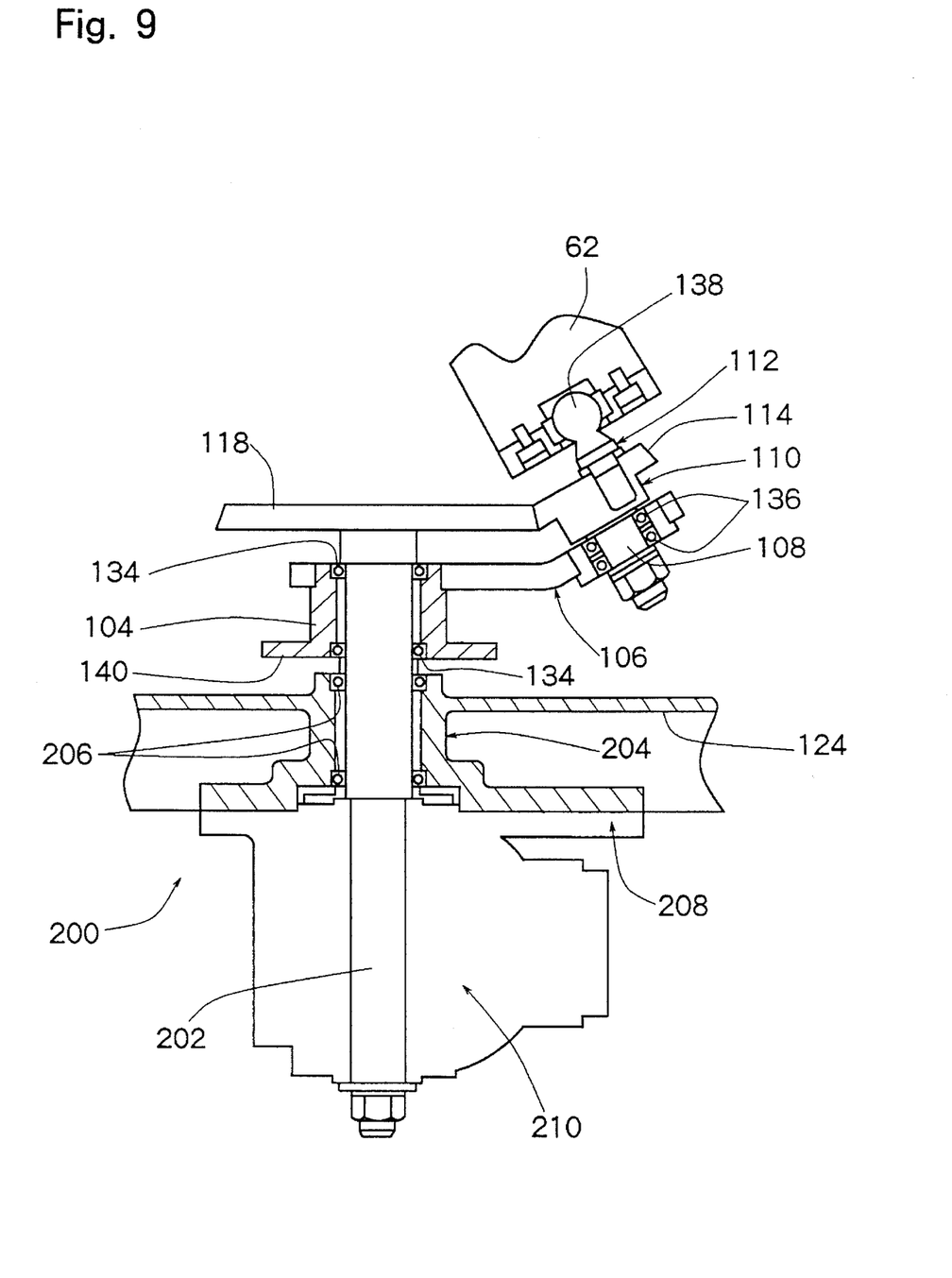
FIG. 9 is a partially enlarged view of the self-revolving/else-revolving mechanism illustrated in FIG. 8.

Next, a self-revolving/else-revolving mechanism 200 provided partly with the other embodiment will be described with reference to FIGS. 8 and 9. In these drawings, the same parts as in FIGS. 1 to 7 are shown by the same numerals. In the structure explained in FIGS. 1 to 7, the main bevel gear 118 is fixed to the shaft holding portion 130 of the holding portion 124. In the self-revolving/else-revolving mechanism 200 in FIGS. 8 and 9, the main bevel gear 118 rotates. That is, the shaft 202 of the main bevel gear 118 is rotatably mounted in a shaft holding portion 204 of a holding portion 124 via a ball bearing 206. The shaft 202 is further fixed in a hollow shaft (not shown) of a hollow-shaft type geared motor 210 secured to a flange 208 provided on the shaft holding portion 204. In the above construction, when the geared motor 210 is energized to rotate the main bevel gear 118 in a direction opposite to the revolution of the main crank 106 about some member else, the speed of revolution of the subordinate crank 110 and the subordinate bevel gear 114 on their own axes can be made even higher. If the geared motor 210 is adapted not to be rotatable, by using a suitable braking means, the main bevel gear 118 can be held in a fixed condition.

While the present invention has been described in detail hereinabove on the basis of some embodiments, it should be understood that the invention is not limited to these embodiments, but various changes and modifications are possible without departing from the scope of the invention. For example, in the embodiments of the present invention, the mechanism for transmitting revolution between the obliquely intersecting axes in the self-revolving/else-revolving mechanism 100 is composed of the main bevel gear 118 and the subordinate bevel gear 114; however, the invention is not limited to this construction. Concretely, the mechanism for transmitting revolution between the obliquely intersecting axes may be constituted from a main roller and a subordinate roller each of a similar shape, instead of the main bevel gear 118 and the subordinate bevel gear 114. The main roller and the subordinate roller each have a conical circumferential portion formed thereon. Friction upon contact that occurs when their conical surfaces are pressed against each other results in the transmission of revolutions. This construction is also included within the scope of the present invention. The explanations for the embodiments of the instantly invented device have hereinbefore been made on the assumption that the device 2 is present on a surface in the air. However, the device of the invention is applicable in water as well. In this case, a water pump or a water ejector may be used instead of a vacuum pump as the pressure reducing means 22.

I claim:

1. A surface treating device having a nozzle for ejecting a surface treating material toward the surface of an object, which comprises a swivel bearing mechanism, an oscillating tube connected to the swivel bearing mechanism so as to be free to pivot about an axis center of the swivel bearing mechanism and such that with respect to the axis center, an end portion thereof is positioned on the side facing the object surface and the other end portion thereof is positioned on the side opposite to the object surface, the nozzle connected to the one end portion side of the oscillating tube, and a self-revolving/else-revolving mechanism connected to the other end portion side of the oscillating tube and making the nozzle self-revolve and else-revolve about the axis center of the swivel bearing mechanism, the self-revolving/else-revolving mechanism including a main crank which has a driven shaft positioned on an axis passing through the axis center of the swivel bearing mechanism on the other end portion side of the oscillating tube and rotationally driven by driving means, and which is rotationally driven integrally with the driven shaft; a subordinate crank having a rotating shaft mounted at a site eccentric from the axis of the main crank and having an axis obliquely intersecting the axis of the main crank; universal joint means connecting that site in the subordinate crank which is eccentric from the axis, to the other end portion side of the oscillating tube; a subordinate bevel gear connected to the rotating shaft of the subordinate crank and rotating integrally with the subordinate crank; a main bevel gear which is provided integrally on a shaft having an axis common to the driven shaft of the main crank and being disposed so as to be free to rotate relative to the driven shaft, and which is engaged with the subordinate bevel gear; and the subordinate bevel gear revolving about the main bevel gear according to the rotation of the main crank while revolving on its own axis.

2. The surface treating device of claim 1 wherein the shaft of the main bevel gear is fixed so as not to rotate.

3. The surface treating device of claim 1 wherein the shaft of the main bevel gear is drivingly connected to other driving means so that the main bevel gear may be rotationally driven in a direction opposite to the direction of rotation of the main crank.

4. The surface treating device of any one of claims 1 to 3 wherein the swivel bearing mechanism includes an annular main oscillating body having a main oscillating axis on a plane parallel to the surface of the object, and a plate-like subordinate oscillating body connected to the main oscillating body so as to have a subordinate oscillating axis perpendicularly intersecting the main oscillating axis of the main oscillating body, with the oscillating tube being connected to the subordinate oscillating body.

5. The surface treating device of any one of claims 1 to 3 wherein a space, which has as a boundary a plane parallel to the surface of the object and passing the axis center of the swivel bearing mechanism, which is present between the boundary surface and the surface of the object, and which belongs to a zone where the oscillating tube and the nozzle move, is surrounded by a tubular case opening at both end portions, by the surface, by surface sealing means mounted at that one opening end portion of the case which faces the surface to seal a gap between the case and the surface, and by oscillating part sealing means for sealing a gap present between the other opening end portion in the case facing the boundary surface and the oscillating tube, whereby a pressure reduction space is defined, the pressure reduction space being connected to pressure reducing means for discharging a fluid from the pressure reduction space to decrease the pressure inside the pressure reduction space.

6. The surface treating device of claim 5 wherein the case is equipped with moving means, the device is caused to suction-adhere to the surface by the pressure of an ambient fluid acting on the case owing to the difference in fluid pressure between the inside and the outside of the case upon the actuation of the pressure reducing means, and the device is movable along the surface by the action of the moving means.

* * * * *